No. 834,999. PATENTED NOV. 6, 1906.
W. SCHÜTZ.
GLASS MAST.
APPLICATION FILED MAR. 10, 1906.
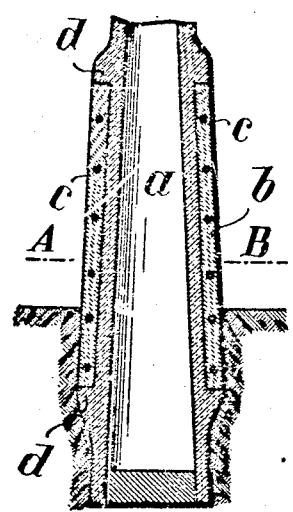
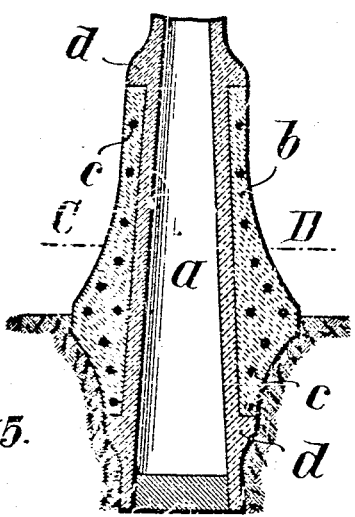
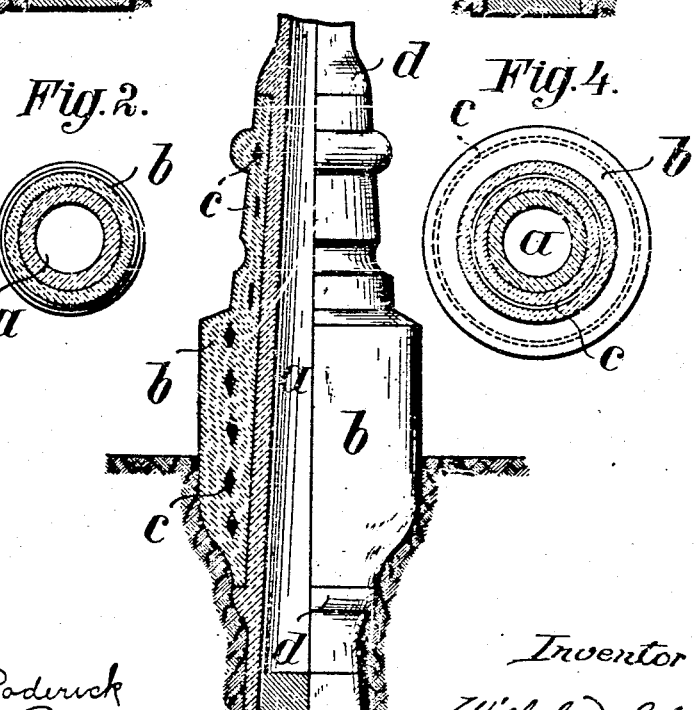
Attest
E. G. Roderick
Inventor
Wilhelm Schütz
by William F. Hall
his atty.

UNITED STATES PATENT OFFICE.

WILHELM SCHÜTZ, OF CASSEL, GERMANY.

GLASS MAST.

No. 834,999.     Specification of Letters Patent.     Patented Nov. 6, 1906.

Application filed March 10, 1906. Serial No. 305,300.

*To all whom it may concern:*

Be it known that I, WILHELM SCHÜTZ, a subject of the German Emperor, residing at Cassel, Germany, have invented certain new and useful Improvements in a Glass Mast, of which the following is a specification, reference being had therein to the accompanying drawings.

In my United States Patent No. 775,637 a glass mast is described and shown which serves for supporting overhead lines of electric railways and for other similar purposes. It has been found that such glass masts, if disposed in crowded streets or great thoroughfares for electric tramways or in other cases, are liable to fractures at their most strained points—that is to say, in the street-level.

My invention relates to improvements in such glass masts whereby they are strengthened at their most strained points, so that their lower parts are even enabled to serve as curbstones and are capable of withstanding considerable shocks.

The objects of my improvement are, first, to provide the glass mast with two collars, one above and the other beneath the level of the street or the like; second, to provide on the part of the glass mast between its two collars a mantle formed of a plastic material which after hardening is sufficiently strong, such as mortar, concrete, cement, clay, and the like, and, third, if so preferred, to strengthen the mantle with embedded metallic parts.

I attain these objects by the constructions illustrated in the accompanying drawings, in which—

Figure 1 is a vertical longitudinal section through the lower part of an erected glass mast with a smooth mantle. Fig. 2 is a cross-section through the same on the line A B in Fig. 1. Fig. 3 is a vertical longitudinal section through the lower part of an erected glass mast with a modified mantle. Fig. 4 is a horizontal section through the same on the line C D in Fig. 3, and Fig. 5 is partly a vertical longitudinal section through and partly an elevation of an erected glass mast with an ornamental mantle.

Similar letters of reference refer to similar parts throughout the several views.

The hollow tapering glass mast $a$ is substantially the same as described in the said patent, only that it is made in one piece with two collars $d\ d$, of which the one is above and the other beneath the level of the street or the like after the glass mast has been erected. The distance between the two collars $d\ d$ is immaterial and may be determined according to experience or to the circumstances. A mantle $b$ is formed according to my invention on the lower part of the glass mast $a$ between the two collars $d\ d$. This mantle $b$ is made from a plastic material which after hardening possesses the required stiffness and strength, so that the mantle $b$ not only strengthens the glass mast $a$ at its most strained point, but is also capable of withstanding considerable shocks. This plastic material may be mortar, concrete, cement, clay, or the like. Preferably the mantle $b$ is further strengthened by means of metallic parts, such as rings $c$, vertical rods, (not shown,) or the like, which parts are embedded in the plastic material during the formation of the mantle $b$. The shape of the mantle is immaterial and may be chosen according to the circumstances or to the fashion in vogue. For example, Figs. 1 and 2 show a smooth mantle $b$ of uniform thickness and with several parallel metallic rings $c\ c$ embedded in it. In Figs. 3 and 4 the mantle $b$ is enlarged in diameter in the level of the street. Fig. 5 shows an ornamental mantle $b$ with very strong or broad metallic rings $c\ c$. Of course also vertical metallic rods (not shown) may be embedded in the mantle $b$, if so desired. The glass collars $d\ d$ are essential, as they prevent moisture from getting between the mantle $b$ and the glass mast $a$.

I have shown a hollow tapering glass mast of a circular cross-section; but it is obvious that glass masts of any other cross-section may be equally employed and provided with mantles of a corresponding or convenient cross-section. The number and section of the metallic parts embedded in the mantle is immaterial. Obviously it is immaterial whether the mantle $b$ be formed on the glass mast at the works or on the respective place after the erection of the glass mast.

What I claim as my invention, and desire to secure by Letters Patent, is—

1. A glass mast made in one piece with two collars, one above and the other beneath the level of the street or the like, in combination with a mantle on the lower part of said glass mast between its two collars and formed of a plastic material (mortar, concrete, cement, clay or the like).

2. A glass mast made in one piece with two collars, one above and the other beneath the level of the street or the like, in combination with a mantle on the lower part of said glass mast between its two collars and formed of a plastic material (mortar, concrete, cement or the like), and strengthening metallic parts embedded in said mantle during its formation.

3. A glass mast made in one piece with two collars, one above and the other beneath the level of the street or the like, in combination with a mantle on the lower part of said glass mast between its two collars and formed of a plastic material (mortar, concrete, cement or the like), and a plurality of metallic rings surrounding said glass mast and embedded in said mantle during its formation.

In testimony whereof I have affixed my signature in presence of two witnesses.

WILHELM SCHÜTZ.

Witnesses:
 WILHELM DOBLER,
 PAUL SCHMIDT.